United States Patent
Gordon et al.

(10) Patent No.: US 10,663,269 B2
(45) Date of Patent: May 26, 2020

(54) INITIATOR GROUNDING CLIP

(71) Applicant: AUTOLIV ASP, INC., Ogden, UT (US)

(72) Inventors: Scott C. Gordon, Layton, UT (US); Alan R. Larsen, Layton, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 15/986,889

(22) Filed: May 23, 2018

(65) Prior Publication Data

US 2019/0360787 A1    Nov. 28, 2019

(51) Int. Cl.
| | |
|---|---|
| *F42B 3/18* | (2006.01) |
| *B60R 16/023* | (2006.01) |
| *B60R 22/46* | (2006.01) |
| *B60R 21/26* | (2011.01) |
| *B60R 22/32* | (2006.01) |

(52) U.S. Cl.
CPC ............... *F42B 3/18* (2013.01); *B60R 16/023* (2013.01); *B60R 21/26* (2013.01); *B60R 22/46* (2013.01); *B60R 2021/26029* (2013.01); *B60R 2022/328* (2013.01)

(58) Field of Classification Search
CPC ......... F42B 3/18; B60R 16/023; B60R 21/26; B60R 22/46; B60R 2021/26029; B60R 2022/328
USPC ..................................................... 102/202.14
See application file for complete search history.

(56) References Cited

U.S. PATENT DOCUMENTS

| | | |
|---|---|---|
| 6,213,800 B1 | 4/2001 | Mramor |
| 6,257,910 B1 | 7/2001 | Mramor |
| 6,644,198 B1 | 11/2003 | Avetisian et al. |
| 7,192,054 B2 | 3/2007 | Smith |
| 7,402,057 B1 | 7/2008 | Strang et al. |
| 8,485,097 B1 | 7/2013 | Nance et al. |
| 8,746,737 B2 | 6/2014 | Ozaki et al. |
| 9,010,803 B2 | 4/2015 | Smith et al. |
| 9,440,615 B2 | 9/2016 | Jordan et al. |
| 2004/0112244 A1 | 6/2004 | Barker et al. |
| 2004/0248475 A1 | 12/2004 | Seminara et al. |

(Continued)

OTHER PUBLICATIONS

U.S. Patent Office, English language version of the International Search Report, Form PCT/ISA/210 for International Application PCT/US2019/29663, dated Jul. 8, 2019 (1 page).

(Continued)

*Primary Examiner* — Joshua E Freeman
(74) *Attorney, Agent, or Firm* — Stephen T. Olson; Harness, Dickey & Pierce, P.L.C.

(57) ABSTRACT

Assemblies and methods for the electrical grounding of an initiator for a vehicle device, e.g. an inflator. Initiator assemblies are provided for inflators in electrical charge transmitting connection via a connector assembly to an electric ground. Initiator assemblies include integrally molded initiator having a molded base forming a connector socket. The molded base includes a grounding clip recess feature. A metallic electrical grounding clip is housed in the grounding clip recess feature. The grounding clip includes a base portion and an extending portion. The extending portion includes a first end proximate and in contact with the base portion and a second end distal from the base portion and with second end in electrical transferring contact with the vehicle device.

20 Claims, 6 Drawing Sheets

(56) References Cited

U.S. PATENT DOCUMENTS

| | | | |
|---|---|---|---|
| 2015/0092364 A1* | 4/2015 | Dumpit | H05K 1/0215 |
| | | | 361/749 |
| 2016/0181731 A1* | 6/2016 | Lehmann | H01R 13/648 |
| | | | 439/108 |
| 2016/0273902 A1 | 9/2016 | Eitschberger | |
| 2016/0380225 A1* | 12/2016 | Bennett | H01L 51/52 |
| | | | 257/40 |

OTHER PUBLICATIONS

U.S. Patent Office, English language version of the Written Opinion of the International Searching Authority, Form PCT/ISA/237 for International Application PCT/US2019/29663, dated Jul. 8, 2019 (6 pages).

* cited by examiner

INITIATOR GROUNDING CLIP

BACKGROUND OF THE INVENTION

Field of the Invention

This invention relates generally to initiator devices such as utilized in vehicular safety restraint systems and, more particularly, to the efficient and effective electrical grounding of such devices.

Discussion of Related Art

Vehicular inflatable restraint systems, e.g., airbag systems, have been developed to supplement conventional safety belts and typically act or serve to protect an occupant in a vehicle by absorbing physical impact resulting upon a vehicle collision using the elasticity of an airbag cushion, with the airbag cushion being deployed into the space between a vehicle occupant and an interior object or surface of the vehicle during a collision event. The deployed airbag acts or serves to decelerate the occupant, thus reducing the possibility of injury to the occupant caused by unintended contact with the interior of the vehicle.

Many typical airbag systems consist of several individual components joined to form an operational module. Such components generally include an airbag, an inflator, a sensor, and an electronic control unit. Airbags are typically constructed or made of a thin, durable fabric or other material that is folded to fit into a compartment of a steering wheel, dashboard, vehicle seat, roof, roof rail, or other space or location in or of a vehicle. The airbag inflator is in fluid communication with the airbag cushion, and is configured to produce, supply or otherwise provide an inflation fluid, e.g., a gas, to inflate the airbag when it is needed. The inflator devices in such installations often include a stored gas supply or a gas generant material stored within the inflator device housing and a preformed initiator in combination with the housing such as to effect release of stored gas or actuation of the gas generant material to produce or supply the inflation gas. Suitable initiators typically include a reactive charge in combination with one or more electrical connectors. A signal sent through the electrical connector(s) actuates the reactive charge, which produces reaction products that effect release of stored gas or actuation of the gas generant material. The sensors detect sudden decelerations of the vehicle that are characteristic of an impact. The readings taken by the sensors are processed in or by the electronic control unit using an algorithm to determine whether a collision has occurred.

Upon detection of an impact of sufficient severity, the control unit sends an electrical signal to the inflator. The inflator using one or more of various technologies, such as including pyrotechnic compounds and stored pressurized gas, produces, forms or otherwise supplies or provides a volume of an inflation gas.

Many types of inflator devices have been disclosed in the art for inflating an inflatable restraint system airbag cushion. Inflatable safety restraint installations typically employ an inflator device to produce or supply inflation gas for inflating an inflatable airbag in the event of a collision. The inflator devices in such installations often include a gas generant material stored within the inflator device housing and a preformed initiator in combination with the housing such as to actuate the gas generant material to produce or supply the inflation gas. Suitable initiators typically include a reactive charge in combination with one or more electrical connectors. A signal sent through the electrical connector(s) actuates the reactive charge, which produces reaction products that actuate the gas generant material.

In practice, initiators in such applications are typically or commonly either directly joined to an inflator device or first joined to an adapter plate or the like which is then joined to the inflator device. Although initiators can, in practice, be directly joined to any selected wall of an inflator device, initiators are typically directly joined to base portions of inflator devices. Further, when an initiator is joined to an adapter plate, the adapter plate can, for example, form an inflator device base or a portion of the inflator device base.

Initiators have typically been joined to an inflator device wall or adapter plate by way of one of two techniques.

A first technique involves inserting the initiator into an appropriate machined interface and crimping the interface to secure the initiator. Such crimping requires that a precise interface be machined into the inflator device wall or adapter plate. Crimping is thus relatively expensive and at least some crimping processes can be subject to quality control problems.

A second technique involves integrally molding an initiator directly to an inflator device wall or adapter plate using a moldable material, such as a thermoplastic material. Such integral molding is typically less expensive than the crimping method mentioned above. However, integral molding processes typically face some disadvantages as well. For example, assemblies involving such integrally molding of an initiator directly to an inflator device wall may require the addition or inclusion of an additional seal, such as in the form of an O-ring, to provide a seal between such wall in or with the associated inflator device because the thermoplastic material does not bond well to the metal inflator wall.

Under current market conditions, there are new varieties of Integrally Molded Initiator (IMI) initiators in the marketplace, being manufactured by multiple companies with such initiators having a molded connector socket. Volumes of "Crimped Machined Adapter" initiators utilizing metallic connector sockets are quickly being replaced by IMI designs because IMI initiators provide a more competitive cost. With such initiators, the metallic connector socket is replaced by an injection molded feature.

New connector concepts, e.g., the AK-2+ connector, have been introduced that depend on a conductive contact within the connector socket, electrically bonded to the inflator body in which the initiator is installed. This contact is made through contact features within a retainer which then interfaces with a 3rd wire on the connector. This 3rd wire is a ground wire that accompanies the firing lines to the vehicle Restraints Control Module (RCM).

Unfortunately, IMI initiators to date have been generally incompatible with such new connectors since such molded plastic connector sockets by their nature are insulative rather than conductive. Conductive resins, although available in the marketplace, generally do not provide sufficiently low resistance properties to meet OEM demands for contact resistances of less than 1 ohm. As a result, there is a demand and a need for solutions or ways to make initiator assemblies, including integrally molded initiators products such as already extensively used in the field, more compatible with the new connector technology.

SUMMARY OF THE INVENTION

A general object of the subject development is to provide solutions or ways to make initiator assemblies, particularly integrally molded initiators more compatible with the new connector technology.

A more specific objective of the subject development is to overcome one or more of the problems described above.

In accordance with selected aspects of the subject development there are provided new initiator assemblies and methods for electrically grounding inflator devices such that overcome at least in part some of the shortcomings or limitations of prior assemblies and methods.

In one aspect of the invention, there is provided an initiator assembly for a vehicle device such as in electrical charge transmitting connection via a connector assembly to an electric ground.

In one embodiment, such an initiator assembly includes an integrally molded initiator and a metallic electrical grounding clip. The integrally molded initiator has a molded base forming a connector socket. The molded base includes a grounding clip recess feature. The metallic electrical grounding clip is at least in part housed in the grounding clip recess feature. The grounding clip includes a base portion and an extending portion. The extending portion has a first end proximate in contact with the base portion and a second end distal from the base portion. The second end is in electrical transferring contact with the vehicle device.

In another embodiment, an initiator assembly for an inflator includes an integrally molded inflator initiator. The integrally molded inflator initiator includes a molded base that forms a connector socket. The molded base includes a sidewall that at least in part defines the connector socket. The sidewall has an inner surface that includes a groove that forms at least a portion of a grounding clip recess feature. The assembly further includes a metallic electrical grounding clip. The grounding clip includes a base portion and an extending portion. The base portion is at least in part housed in the groove formed in the sidewall on an inner surface of the connector socket. The extending portion has a first end proximate in contact with the base portion and a second end distal from the base portion. The second end is in electrical transferring contact with the inflator.

In another aspect of the subject development, a method for electrically grounding a vehicle device having an integrally molded initiator is provided. In one embodiment, such a method involves housing a metallic electrical grounding clip at least in part in a grounding clip recess feature in a connector socket formed at least in part by a molded base or a collar of the integrally molded inflator initiator, the grounding clip including a base portion and an extending portion, the extending portion having a first end proximate and in contact with the base portion and a second end distal from the base portion. The method further involves placing the second end of the ground clip extending portion in electrical transferring contact with a body portion of the vehicle device.

As used herein, references to items being "integral" or "integrally joined" or "integrally formed" are to be understood to generally refer to items formed in one part without further assembly requirements or in the case of a part formed via mold processing, being formed in one molding shot.

While the broader practice of the invention is not necessarily limited to specific or particular types or forms of initiator assemblies, the invention is believed to have particular beneficial applicability in or with an initiator configuration or type selected from the group of an Integrally Molded Initiator (IMI) configuration and/or Molded-in-Base (MIB) initiator configuration.

Other objects and advantages will be apparent to those skilled in the art from the following detailed description taken in conjunction with the appended claims and drawings.

DETAILED DESCRIPTION OF THE INVENTION

The present invention provides solutions or ways to make integrally molded initiator products more compatible with the new connector technology.

Figure 1:
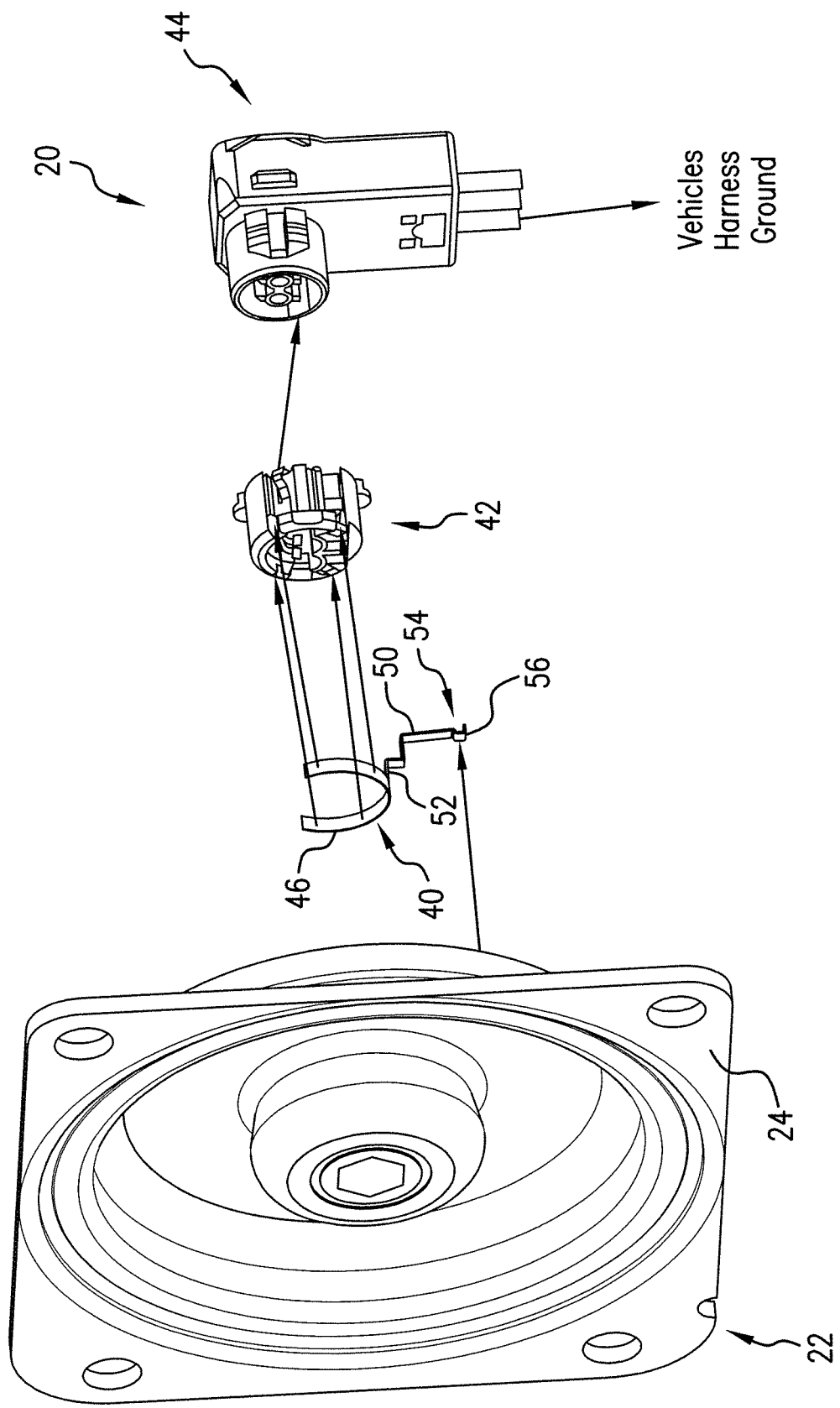
FIG. 1 is a fragmentary partially exploded perspective view of an inflator connector assembly illustrating electric charge transfer in accordance with one embodiment of the invention.
Figure 2:
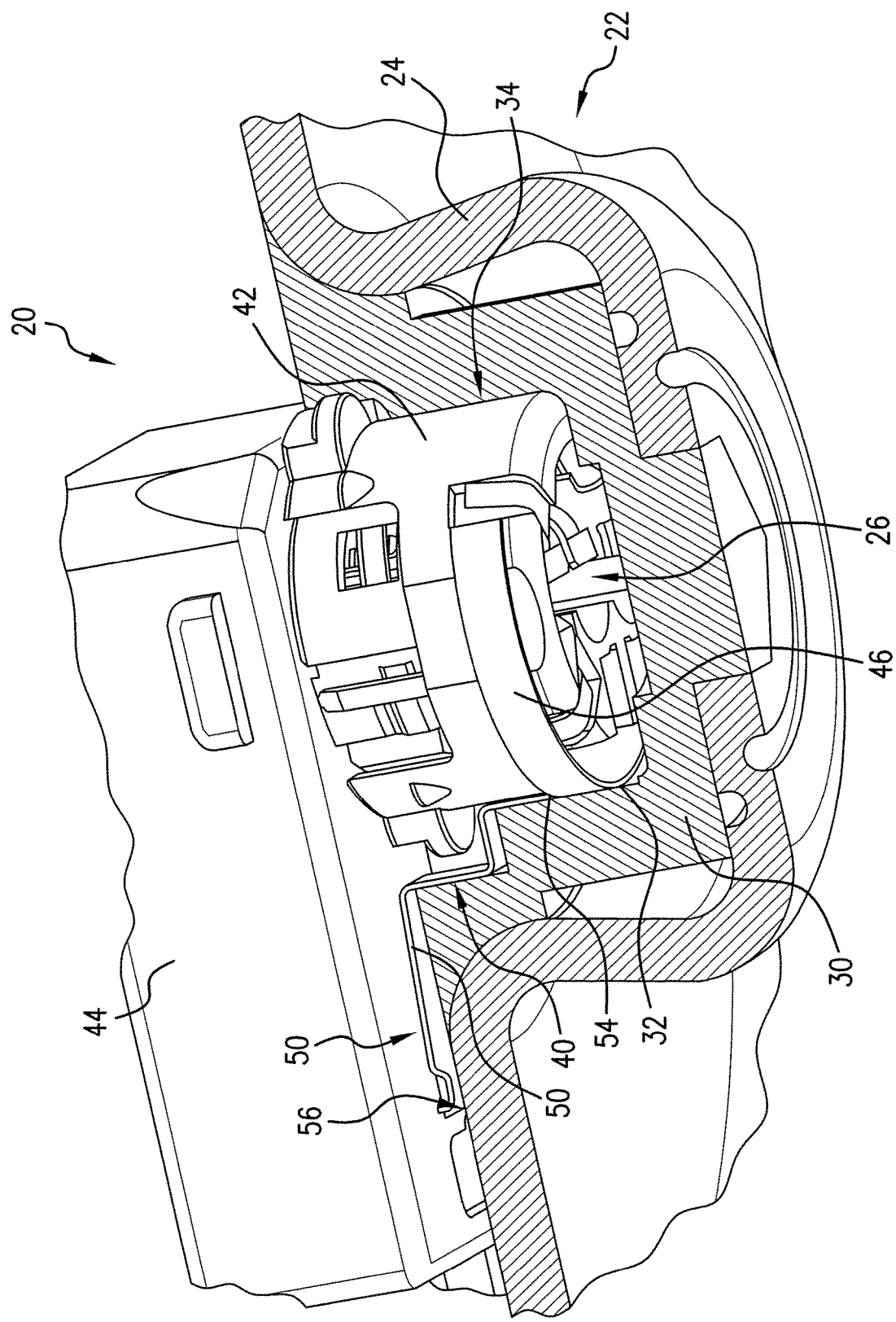
FIG. 2 is a simplified partially sectional side view showing electrical connection with an inflator initiator in accordance with one embodiment of the invention.

Turning first to FIGS. 1 and 2, there is shown an inflator initiator connector assembly, generally designated by the reference numeral 20, including an inflator device 22 such as known in the art for inflating a vehicle occupant protection device to help protect an occupant of a vehicle. Only a base portion 24 of the inflator device 22 is shown.

As will be appreciated by those skilled in the art and guided by the teachings herein provided, the broader practice of the subject invention is not necessarily limited by or to inflators of specific construction or modes of operation. That is, the present invention is applicable to various inflator constructions, including inflators of different shapes and sizes and inflators with different modes of operation. For example, the invention can be applied to inflators which release inflation fluid from a container, which generate inflation fluid by ignition of combustible gas generating material, as well as inflators that supply inflation fluid by combinations of stored and generated or produced inflation fluid.

The inflator device 22 includes an initiator assembly (pin only shown in FIG. 2) 26 centrally disposed in the inflator base 24. The initiator assembly incorporates an initiator device of a type that is sometimes herein referred to as a Molded-In-Base (MIB) Initiator. More specifically, the initiator assembly 26 includes an integrally molded initiator having a molded base 30. The molded base 30 includes a sidewall 32 such as at least in part defines a connector socket 34. The molded base 30 includes a grounding clip recess feature such as in the form of a groove in or on the inner surface of the socket sidewall 32. The grounding clip recess feature serves to house or otherwise appropriately contain at least a part or portion of a metallic electrical grounding clip 40, described in greater detail below. A grounding clip recess feature in accordance with an embodiment of the invention is more particularly shown and described in connection with the embodiment shown in FIGS. 7-9, discussed below.

Joined or connected to the initiator assembly 26 and in electrical communication with the grounding clip 40 is a retainer device 42. As such retainer devices are well-known in the art and to those skilled in the art, the particulars of the construction and operation thereof are not detailed herein.

An electrical connector 44, such as identified above, is joined or connected to the initiator assembly 26 via the retainer device 42. In practice, electrical connectors are typically supplied by the manufacturer of the vehicle in which the inflator is mounted, rather than by the manufacturer of the inflator.

The electrical connector 44 is joined or connected to the electric circuitry (not shown) of the vehicle into which the inflator has been installed. As will be appreciated, the electric circuitry may include a vehicle condition sensor or the like such as to appropriately send a signal to actuate the inflator and, more particularly, the initiator 26 to effect the release or discharge of inflation fluid from the inflator device to an associated inflatable restraint device, e.g., airbag (not shown).

The connector 44 includes a ground wire that goes to the main wire harness (not shown) where it connects to a ground. The ground wire typically accompanies the firing lines but with the firing lines or leads going to the vehicle RCM (Restraints Control Module). Upon assembly, the electrical connector 44 is in conductive contact within the connector socket 34 through contact features within the retainer 42 and the retainer in turn interfaces with the ground wire in, of or on the connector 44. As a result and in accordance with a preferred practice of the invention, the grounding clip acts as, serves or otherwise provides, at least in part, as an electrical connection from the inflator body to the ground connection within the connector assembly.

As will be appreciated by those skilled in the art and guided by the teachings herein provided, an electric charge, e.g., a triboelectric charge, can develop on an inflator, particularly the inflator body. With the subject invention, the grounding clip acts or serves to direct such charge from the inflator body to the electrical ground (i.e., the ground wire of the connector).

As shown in FIG. 1, an electric charge on the inflator device 22, e.g., the base portion 24, is transferred to the grounding clip 40. Upon assembly and connection of the initiator assembly, the charge is transferred from the grounding clip 40 to the retainer device 42. The charge is in turn transferred from the retainer device 42 to the electrical connector 44 which in turn safely transmits the charge to the vehicle harness ground (not shown).

The grounding clip 40 is at least in part housed in a grounding clip recess feature formed or included in the socket sidewall 32. The grounding clip 40 includes a base portion 46 and an extending portion 50. The base portion 46, in whole or in part, is housed or contained in the grounding clip recess feature. As shown in FIG. 1, the base portion 46 of the grounding clip 40 may have the shape of an arc or partial circular shape however the broader practice of the invention is not necessarily so limited as other shapes including, for example, straight and right angle shapes may, if desired, be utilized in other particular application.

The extending portion 50 has a first end 52 proximate and in contact with the base portion 46. The extending portion 50 has a second end 54 distal from the base portion 46. The second end 54 is in electrical transmitting contact with the metallic inflator base 24. If desired and as shown, the second end 54 may include a contact bump 56 at the end thereof to better ensure electrical contact between the grounding clip and the inflator base 24 or other selected electric transferring element or component of the associated inflator.

The grounding of the assembly involves electrical transferring or transmitting contact or communication between or from:
1. the inflator base 24 to the grounding clip 40 via contact at or with the grounding clip extending portion 50, i.e., the distal second end 54, e.g., the contact bump 56;
2. the grounding clip 40 to the retainer device 42; and
3. the retainer device 42 to the electrical connector 44 and, for example, a ground wire included therein that typically accompanies the firing lines, with the ground wire going to the main wire harness where it connects to a ground and the firing lines or leads going to the vehicle RCM (Restraints Control Module).

In practice, retainer devices employed in such assemblies commonly include four electrical contacts or tabs generally equally or uniformly spaced along the periphery thereof.

As a safety precaution and to ensure desired operation, in accordance with one preferred embodiment of the invention it is desirable to employ a grounding clip base portion of sufficient size and dimensions to ensure electrical transferring or transmitting contact or communication between or from the grounding clip to at least two retainer device electrical contacts or tabs. To that end, it is preferable that the grounding clip base portion, when in the shape of an arc or partial circle, extend in an arc or partial circle measuring at least about 90 degrees, in some cases at least about 100 degrees and in some cases at least about 115 degrees, when used in conjunction with retainer devices that include four electrical contacts or tabs generally equally or uniformly spaced along the periphery thereof.

It is to be understood, however, that the broader practice of the subject invention is generally not limited to or by the size or dimensions of the grounding clips employed therein, including the size or dimensions of the base portion of the grounding clips.

Figure 3:
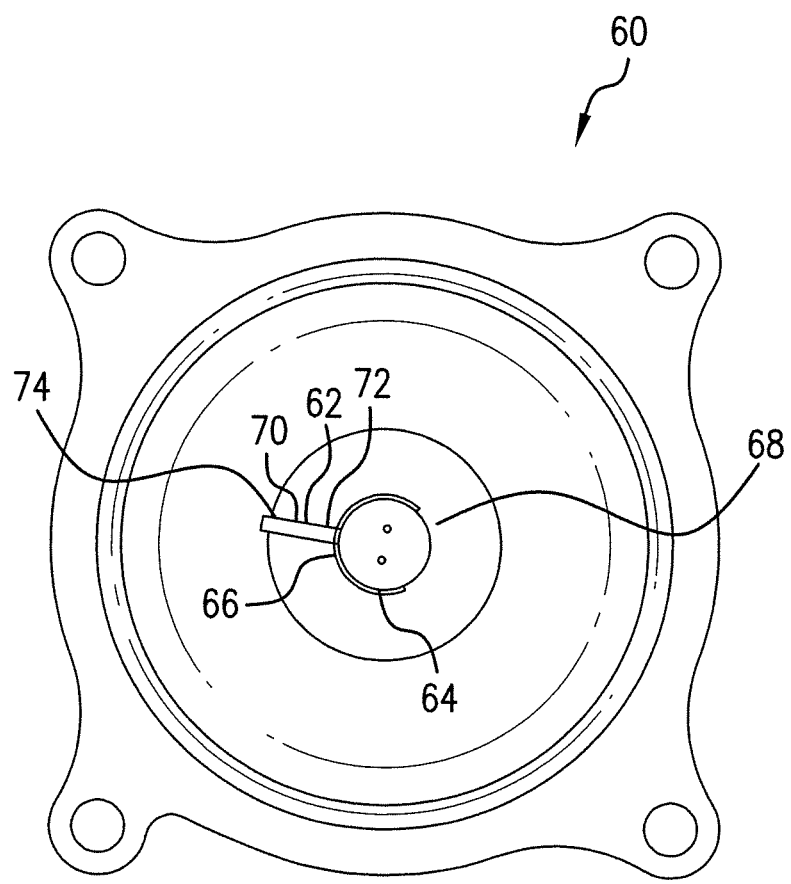
FIG. 3 is a top view of an inflator base incorporating an electrical grounding clip in accordance with one embodiment of the invention.

FIG. 3 illustrates an inflator base 60 that incorporates an electrical grounding clip 62 in accordance with one embodiment of the invention. The grounding clip 62 and, more particularly, the base portion 64 thereof is housed or contained in a grounding clip recess feature 66 such as formed or included in a sidewall of the integrally molded initiator molded base connector socket 68. The grounding clip 62 is similar in construction and form as the grounding clip 40 described above and shown in FIGS. 1 and 2 and has or includes an extending portion 70 having a first end 72 proximate and in contact with the base portion 64 and a second end 74 distal from the base portion 64 and in electrical transferring contact with the inflator base 60.

Figure 4:
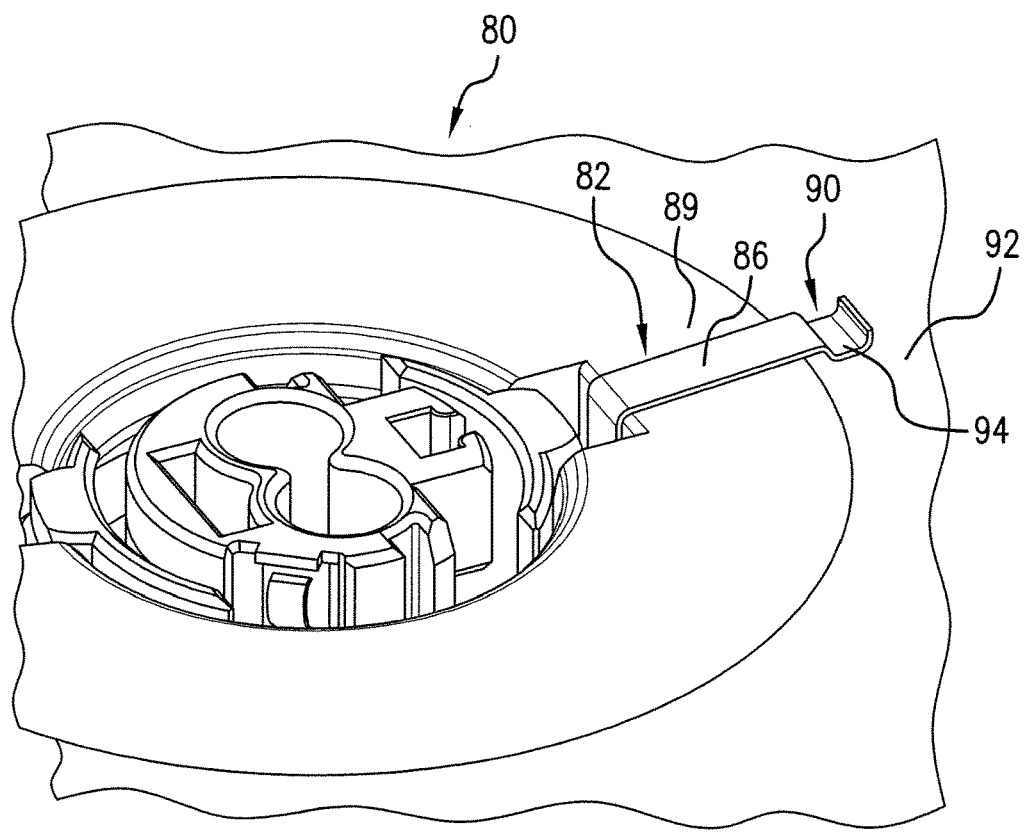
FIG. 4 is a simplified top view of an inflator base assembly incorporating an electrical grounding clip in accordance with one embodiment of the invention.
Figure 5:
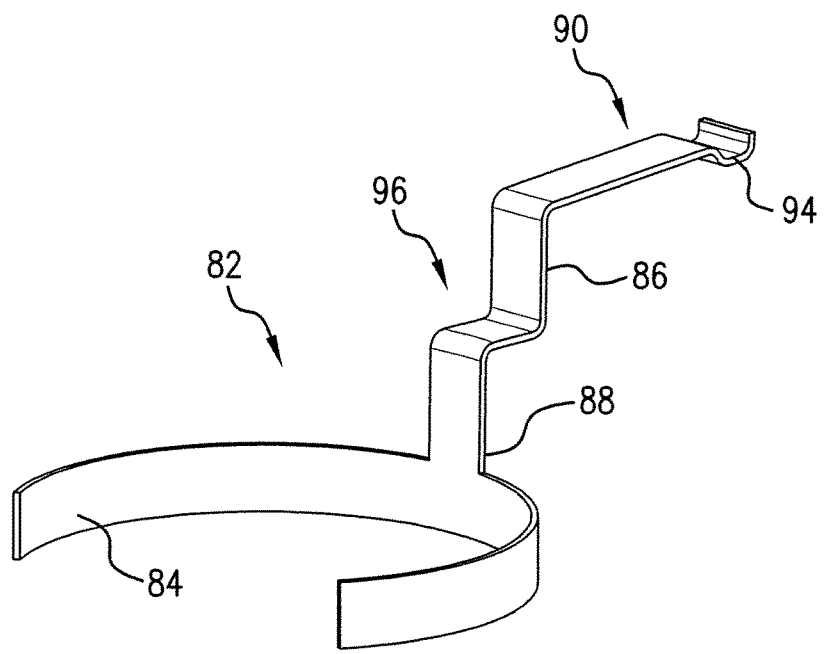
FIG. 5 is a simplified perspective view showing in isolation the grounding clip of the inflator base assembly shown in FIG. 4.

FIG. 4 illustrates an inflator base assembly 80 incorporating an electrical grounding clip 82 in accordance with one embodiment of the invention. FIG. 5 illustrates the grounding clip 82 in isolation.

In this embodiment, the grounding clip 82 is similar to the grounding clip 40 shown in FIGS. 1 and 2 includes a base portion 84 and an extending portion 86. The base portion 84, in whole or in part, is housed or contained in the grounding clip recess feature (not shown). The extending portion 86 has a first end 88 proximate and in contact with the base portion 84. The extending portion 86 spans the insulated portion 89 (the mold resin) and has a second end 90 distal from the base portion 84. The second end 90 is in electrical transferring or transmitting contact with the inflator base 92. If desired and as shown, the second end 90 may include a contact bump 94 at the end thereof to better ensure electrical transmitting or transferring contact between the grounding clip 40 and the inflator base 92. The extending portion 86 also includes an intermediately positioned step 96, such as suitably interposed between the first end 88 and the second end 90, and showing the flexibility of the subject design to meet the shapes and contours of connection sockets of different designs and configurations.

Figure 6:
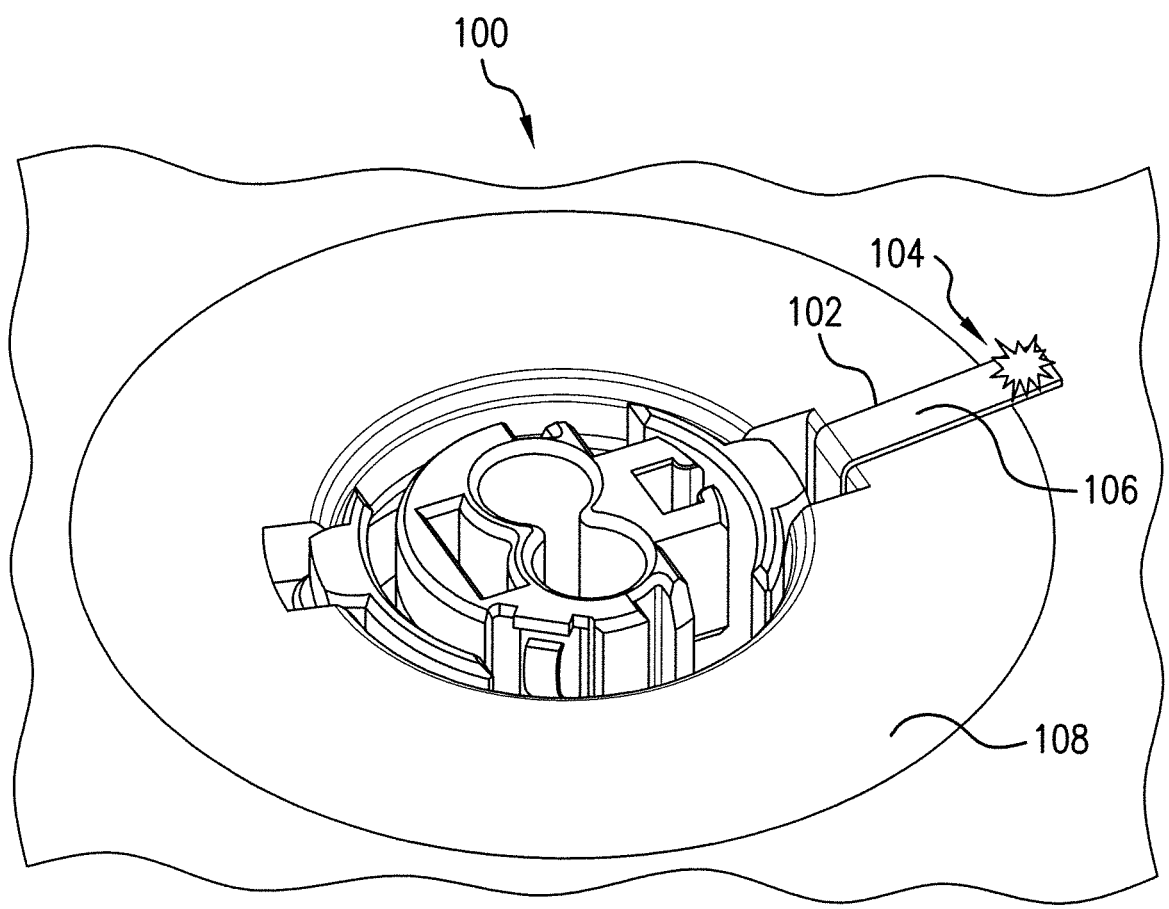
FIG. 6 is a simplified top view of an inflator base assembly incorporating an electrical grounding clip in accordance with another embodiment of the invention.

FIG. 6 illustrates an inflator base assembly 100 incorporating an electrical grounding clip 102 in accordance with another embodiment of the invention. While the inflator base assembly 100 is generally similar to the inflator base assembly 80 shown in FIG. 4 and described above and the grounding clip 102 is generally similar to the grounding clip 82 shown in FIGS. 4 and 5 and described above, the grounding clip 102 primarily differ from the grounding clip 82 in that in the grounding clip 102 the distal end 104 of the extending portion 106 is shown as laser welded to the inflator base 108 to ensure electrical connection therewith rather than relying on the inclusion of a contact bump.

While the invention has been described above making specific reference to embodiments wherein the electrical grounding clip is disposed in or in association with Molded-In-Base (MIB) forms of integrally molded initiators, the broader practice of the invention is not necessarily so limited.

Figure 7:
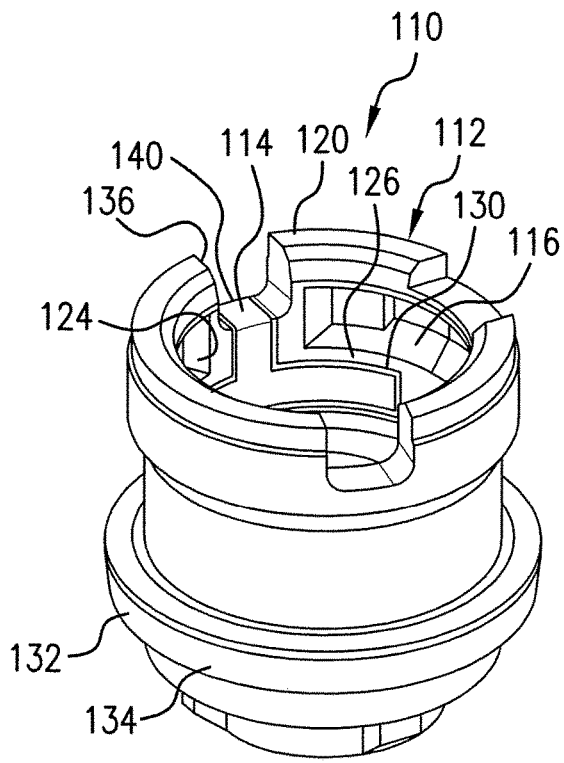
FIGS. 7 and 8 are perspective fragmentary views showing the molded base portion of an integrally molded inflator initiator incorporating a grounding clip in accordance with one embodiment of the invention.
Figure 8:
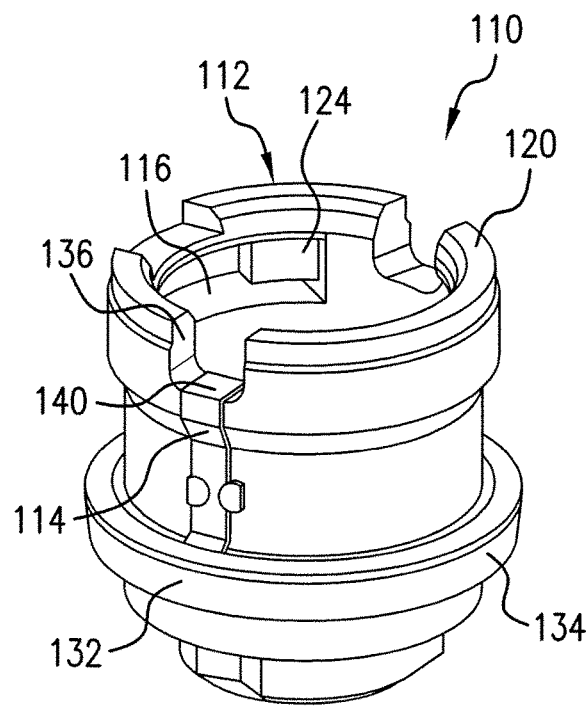
Figure 9:
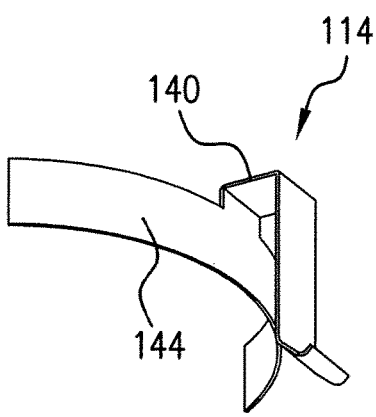
FIG. 9 is a simplified perspective view showing in isolation the grounding clip of the molded base portion of an integrally molded inflator initiator incorporating a grounding clip shown in FIGS. 7 and 8.

FIGS. 7 and 8 illustrate the invention as applied to an IMI initiator 110, specifically to the illustrated molded connector socket base or collar 112 and containing or including the electrical grounding clip 114. As will be appreciated, FIGS. 7 and 8 are fragmentary views showing the molded base portion of an integrally molded inflator initiator incorporating a grounding clip. FIG. 9 illustrates the electrical grounding clip 114 in isolation.

As shown, the connector socket base 112 includes or forms a connector socket 116 for proper electrical and actuating connection of an associated initiator (not shown) such as is known in the art. More particularly, the molded connector socket base 112 is at least in part composed of a sidewall 120 at least in part defining the connector socket 116. The sidewall 120 includes or has an inner surface 124 wherein at least a portion of a grounding clip recess feature 126 in accordance with the subject development is preferably disposed. As will be appreciated by those skilled in the art and guided by the teachings herein provided, the grounding clip recess feature 126 can take various forms or shapes, including, for example, the form or shape of a recess, cavity, groove, indentation, or the like, generally referred to herein as a "recess." For example, the sidewall inner surface 124 of connector socket base 112 includes a groove 130 that constitutes the grounding clip recess feature 126 wherein the grounding clip 114 is at least in part housed or contained.

The IMI initiator molded connector socket base 112 includes a metal portion 132 disposed on an exterior portion of the molded connector socket base or collar 134. As detailed below, the metal portion 132 serves to provide an electrical transferring or transmitting contact between the IMI initiator and the inflator assembly into which the initiator is disposed. To that end, the sidewall 120 can include a cut-out 136. The grounding clip extending portion 140 can desirably traverse the sidewall 120 at the cut-out 136. The distal end 142 of the grounding clip extending portion 140 is desirably in contact with the IMI initiator metal portion 132 and, if desired, can be heat staked or otherwise selectively joined or connected therewith.

As shown in FIGS. 7-9, the electrical grounding clip 114 includes a base portion 144 such as is primarily housed or contained within the grounding clip recess feature 126 in the molded connector socket base or collar 112.

Thus, it will be appreciated that the subject invention and particularly the grounding clip element thereof can desirably be applied to either or both MIB (Molded-in-Base) and the IMI (Integrally Molded Initiator) initiating devices. In practice, the metal component in an MIB initiating device is commonly referred to as a "Base" and the metal component used on an IMI initiating device is commonly referred to as a "Collar".

In either such application and in the general practice of the subject invention, the grounding clip desirably acts or provides an electrical connection from the inflator body to the ground connection within the connector assembly. In certain scenarios, the inflator body can develop a triboelectric charge. As described above, the subject grounding clip can desirably direct that charge from the inflator body to ground (3rd wire of connector).

While the invention has been described above making reference to embodiments wherein subject initiator assemblies are incorporated or disposed in an inflator, particularly an airbag inflator such as used in or associated with vehicle passive restraint systems, those skilled in the art and guided by the teachings provided herein will understand and appreciate that the broader practices of the invention is not necessarily so limited. For example, the subject invention can, if desired, be applied or practiced with a wide variety of vehicle devices including seatbelt pretensioners, retractors, tether cutters, battery disconnects or the like.

As detailed herein, the subject invention can desirably serve to improve or increase the compatible of integrally molded initiator products with the new three wire connector technology, e.g., connectors that include a third wire, i.e., a ground wire.

The subject initiator grounding clip is a metallic insert that can interface with molded features on the molded IMI socket and provides an electrical ground path from the retainer contacts within the initiator connector socket, to a metal contact surface externally from the connector socket to a metallic, load bearing surface that interfaces with the inflator body. The attachment of an initiator grounding clip as herein provided to the IMI socket may include such innovations as a thermal crimp, by which molded plastic is heat deformed over the ground clip in order to anchor it in place. The advantages of the subject grounding clip and the subject approach to initiator grounding includes maintaining the significant cost advantage offered by IMI technology, as opposed to machined adapter technology. Additionally, incorporation and utilization of a grounding clip such as herein provided permits those using the new connector technology to easily adapt to the new connector technology.

Further, the invention satisfies a growing interest, desire and demand on the part of automotive OEM's to remove the current grounding mechanisms from the inflator module and place the grounding function in the initiator connection interface. Moreover, the subject initiator ground clip option is a novel solution that provides a cost advantage over other options. Furthermore, it offers a more reliable connection than at least some current options and it also offers flexibility to the customer. For example, a customer could utilize the same initiator, i.e., the same IMI initiator, with or without the initiator ground clip depending on the desire of the customer to utilize the new connector technology.

As will be appreciated, certain standard elements not necessary for an understanding of the invention may have been omitted or removed from the figures for purposes of facilitating illustration and comprehension.

The claims are not intended to include, and should not be interpreted to include, means-plus- or step-plus-function limitations, unless such a limitation is explicitly recited in a given claim using the phrase(s) "means for" or "step for," respectively.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An initiator assembly for an inflator having a metal body, the initiator assembly in electrical charge transmitting connection via a connector assembly to an electric ground, the assembly comprising:
   an integrally molded initiator having a molded base forming a connector socket, the molded base including a grounding clip recess feature; and
   a metallic electrical grounding clip at least in part housed in the grounding clip recess feature, the grounding clip including a base portion and an extending portion, the extending portion having a first end proximate and in contact with the base portion and a second end distal from the base portion, wherein the second end is in electrical transferring contact with the inflator,
   wherein the second end extends outside the connector socket and is electrically coupled to the metal inflator body.

2. The assembly of claim 1 wherein the vehicle device comprises an inflator.

3. The assembly of claim 1 wherein the molded base includes a sidewall at least in part defining the connector socket, the sidewall having an inner surface including at least a portion of the grounding clip recess feature.

4. The assembly of claim 3 wherein the sidewall includes a cut-out and wherein the grounding clip extending portion traverses the sidewall at the cut-out.

5. The assembly of claim 3 wherein the grounding clip recess feature includes a groove formed in the sidewall on an inner surface of the connector socket.

6. The assembly of claim 5 wherein the grounding clip base portion is at least in part housed in the groove formed in the sidewall on an inner surface of the connector socket.

7. The assembly of claim 6 wherein the grounding clip extending portion extends from the grounding clip base portion at least in part housed in the groove formed in the sidewall on an inner surface of the connector socket to the metal inflator body.

8. The assembly of claim 6 wherein the grounding clip extending portion extends from the grounding clip base portion to a base of the inflator containing the assembly.

9. The assembly of claim 1 wherein the second end of the extending portion includes a contact bump.

10. The assembly of claim 1 wherein the second end of the extending portion is attached to the metal inflator body.

11. The assembly of claim 10 wherein the second end of the extending portion is laser welded to the metal inflator body.

12. An initiator assembly for an inflator having a metal body, the assembly comprising:
    an integrally molded initiator having a molded base forming a connector socket, the molded base including a sidewall at least in part defining the connector socket, the sidewall having an inner surface including a groove forming at least a portion of a grounding clip recess feature; and
    a metallic electrical grounding clip including a base portion and an extending portion, with the base portion at least in part housed in the groove formed in the sidewall on an inner surface of the connector socket, the extending portion having a first end proximate in contact with the base portion and a second end distal from the base portion, wherein the second end extends outside of the connector socket and is electrically coupled to the inflator metal body.

13. The assembly of claim 12 wherein the second end of the extending portion includes a contact bump.

14. The assembly of claim 12 wherein the second end of the extending portion is attached to the metal inflator body.

15. The assembly of claim 14 wherein the second end of the extending portion is heat staked to the metal inflator body.

16. The assembly of claim 14 wherein the second end of the extending portion is laser welded to the metal inflator body.

17. A method for electrically grounding an inflator device having a metal body and an integrally molded initiator, the initiator in electrical charge transmitting connection via a connector assembly to an electric ground, the method comprising:
    housing a metallic electrical grounding clip at least in part in a grounding clip recess feature in a connector socket formed at least in part by a molded base or a collar of the integrally molded initiator, the electric grounding clip including a base portion and an extending portion, the extending portion having a first end proximate and in contact with the base portion and a second end distal from the base portion, with the second end extending outside the connector socket; and
    electrically coupling the second end of the ground clip extending portion with the metal inflator body.

18. The method of claim 17, wherein the metal inflator body comprises a base of the inflator.

19. The method of claim 17 additionally comprising attaching the second end of the extending portion to the metal inflator body or a metallic collar disposed on an exterior portion of the connector socket.

20. The method of claim 19 wherein said attaching of the second end comprises one of heat staking or laser welding.

* * * * *